United States Patent
Matsumoto et al.

(10) Patent No.: US 6,340,031 B1
(45) Date of Patent: Jan. 22, 2002

(54) CHECK VALVE FOR REFUELING PIPE OF FUEL TANK

(75) Inventors: Hideki Matsumoto; Hiroshi Kitamura; Masaaki Horiuchi, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/340,195

(22) Filed: Jun. 28, 1999

(30) Foreign Application Priority Data

Jun. 30, 1998 (JP) .......................... 10-185055
Jun. 30, 1998 (JP) .......................... 10-185056
Jun. 30, 1998 (JP) .......................... 10-185057

(51) Int. Cl.$^7$ .......................... B06K 15/04; F16K 21/02
(52) U.S. Cl. .............................. 137/513.3; 137/516.29; 137/536; 137/542; 137/592
(58) Field of Search ................................ 137/592, 590, 137/513.3, 516.29, 542, 543, 536

(56) References Cited

U.S. PATENT DOCUMENTS

| | | | | |
|---|---|---|---|---|
| 2,675,021 A | * | 4/1954 | Allin | 137/536 |
| 2,713,874 A | * | 7/1955 | Sundstrom | 137/513.3 |
| 2,771,091 A | * | 11/1956 | Baker et al. | 137/516.29 X |
| 2,949,928 A | * | 8/1960 | Hobson | 137/542 X |
| 3,029,835 A | * | 4/1962 | Biello et al. | 137/516.29 X |
| 3,548,868 A | * | 12/1970 | Mullaney, III | 137/516.29 X |
| 3,911,949 A | * | 10/1975 | Hilden et al. | 137/592 X |
| 4,362,184 A | * | 12/1982 | Marabeas | 137/536 X |
| 4,457,409 A | * | 7/1984 | Fukushima et al. | 137/513.3 |
| 4,474,189 A | * | 10/1984 | Brown | 137/513.3 |
| 4,515,179 A | * | 5/1985 | Edmunds et al. | 137/536 X |
| 4,766,924 A | * | 8/1988 | Lee, III et al. | 137/536 |
| 4,905,726 A | * | 3/1990 | Kasugai et al. | 137/433 |
| 4,932,444 A | * | 6/1990 | Micek | 137/588 |
| 4,974,645 A | * | 12/1990 | Johnson | 137/587 X |
| 4,991,615 A | * | 2/1991 | Szlaga et al. | 137/587 |
| 5,044,397 A | * | 9/1991 | Szlaga et al. | 137/588 |
| 5,052,433 A | * | 10/1991 | Levenez | 137/513.3 |
| 5,097,865 A | * | 3/1992 | Riley | 137/536 X |
| 5,174,327 A | * | 12/1992 | Truax et al. | 137/536 X |
| 5,211,194 A | * | 5/1993 | Scott et al. | 137/590 |
| 5,375,633 A | * | 12/1994 | Bucci | 137/587 |
| 5,518,018 A | * | 5/1996 | Roetker | 137/587 |
| 5,660,206 A | * | 8/1997 | Neal et al. | 137/592 |
| 5,694,968 A | * | 12/1997 | Devall et al. | 137/202 |
| 5,755,252 A | * | 5/1998 | Bergma et al. | 137/202 |
| 5,785,078 A | * | 7/1998 | Burian et al. | 137/590 |
| 5,924,438 A | * | 7/1999 | Cimminelli et al. | 137/513.3 |
| 5,924,445 A | * | 7/1999 | Ambrose et al. | 137/590 |
| 5,950,655 A | * | 9/1999 | Benjey | 137/587 |
| 6,000,426 A | * | 12/1999 | Tuckey et al. | 137/592 |
| 6,026,855 A | * | 2/2000 | Jackson et al. | 137/592 |

FOREIGN PATENT DOCUMENTS

JP                88529            6/1988

* cited by examiner

*Primary Examiner*—John Rivell
(74) *Attorney, Agent, or Firm*—Armstrong, Westerman, Hattori, McLeland & Naughton, LLP

(57) ABSTRACT

A first spring guide fitting the outer periphery of one end portion of a coil spring is provided at an end wall portion of a valve casing, and a second spring guide fitting the inner periphery of the other end portion of the coil spring is provided at a valve element so that the first and second spring guides do no interfere with each other. Further, a valve element of the check valve is provided with an elastic sealing member having a lip portion to be seated on a valve seat portion of the valve casing. Moreover, the valve element is formed with a bypass hole communicating upstream and downstream sections of the check valve.

3 Claims, 2 Drawing Sheets

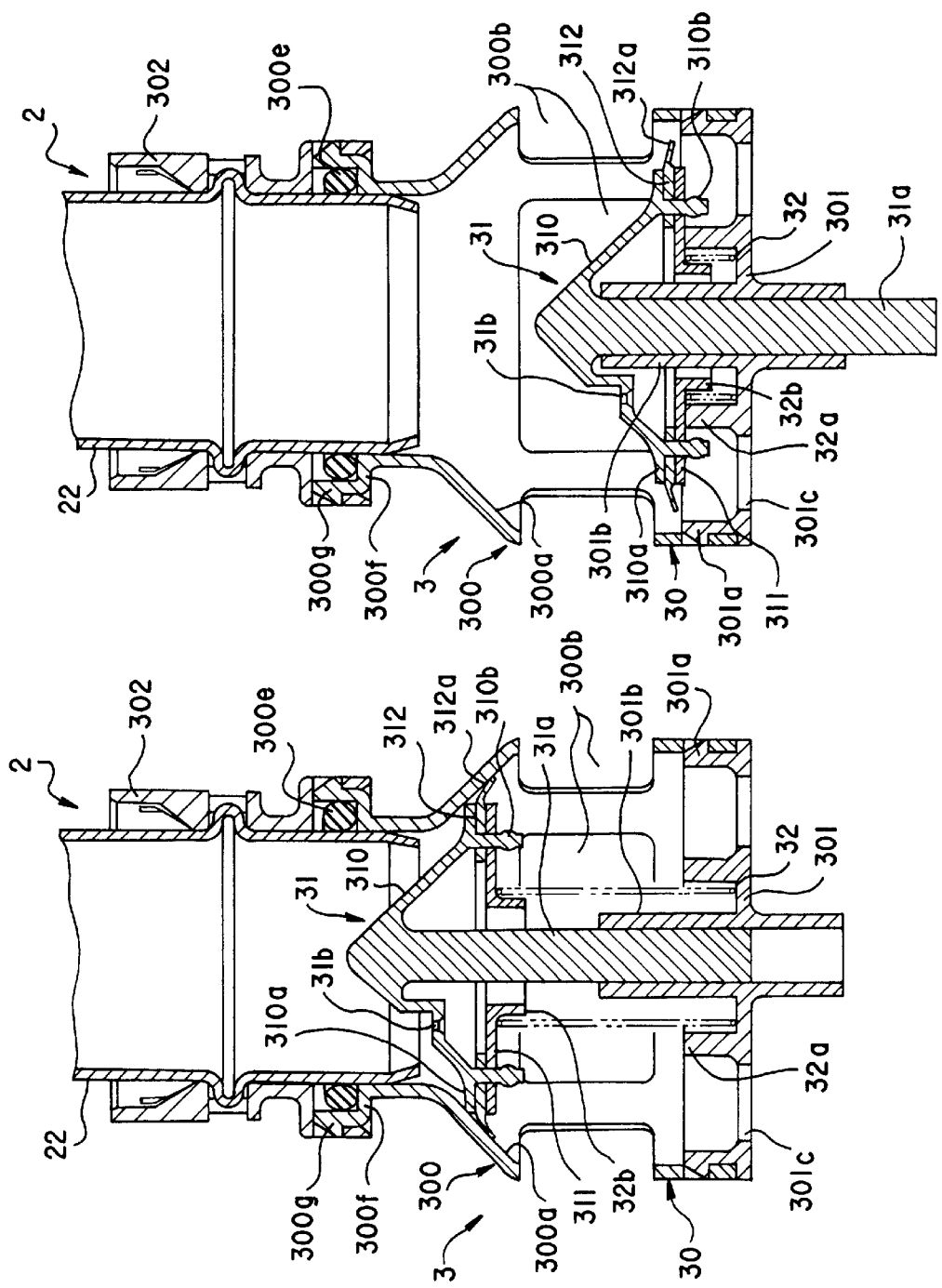

CHECK VALVE FOR REFUELING PIPE OF FUEL TANK

BACKGROUND OF THE INVENTION

1. Field of the Invention

The present invention relates to a check valve for a refueling pipe mainly applied to a refueling pipe for a fuel tank of a vehicle.

2. Description of the Related Art

Conventionally, there has been known such a technique that a fuel tank is provided with a float valve positioned at the inlet portion of a vent path continuing to a canister so that, when fuel is fully filled within the fuel tank, the float valve is closed to stop the air breather within the fuel tank. When the float valve is closed to stop the air breather within the fuel tank in this manner, the fuel supplied from a refueling nozzle rises within the refueling pipe. Then, when the fuel thus rising within the refueling pipe reaches the tip end of the refueling nozzle, the automatic-stop mechanism of the refueling nozzle G operates to automatically stop the fuel supply.

In this case, there may arise such a so-called spitting phenomenon that, immediately after the closing of the float valve, the pressure within the fuel tank increases pulsatively due to the inertia of the fuel supplied from the refueling pipe, and so the fuel flows backward from the fuel tank side to the refueling pipe due to the reaction and rises within the refueling pipe and then spouts out of the refueling pipe before the automatic-stop mechanism of the refueling nozzle is operated.

In order to prevent such a spitting phenomenon, there has been known such a technique as disclosed in Japanese Utility Model Unexamined Laid-Open (Kokai) No. Sho. 63-88529 that a check valve for preventing the backward flow of the fuel from the fuel tank side to the refueling pipe side is provided at the end portion on the fuel tank side of the refueling pipe. This check valve is provided with a valve element which is biased by a spring toward a valve seat portion of a tapered-shape formed at the refueling pipe side of a valve casing. The valve element is pushed and opened due to the dynamic pressure of the fuel at the time of fuel supply while, when the fuel flows backward from the fuel tank side, the valve element is seated on the valve seat portion thereby to prevent the backward flow of the fuel into the refueling pipe.

In the case where the check valve is provided in the aforesaid manner, normally, the communicating state between the inner portion of the fuel tank and the refueling pipe is cut off by the check valve, and hence the inner portion of the fuel tank is completely sealed when the vent path is clogged. As a result, there may arise such a problem that the increase of the inner pressure of the fuel tank cannot be suppressed due to the evaporation of the fuel in a high temperature state.

In the case of providing the check valve in the aforesaid manner, it is desirable to set the stroke of the valve element at the time of opening and closing the check valve to a sufficiently large value so that the fuel can be smoothly injected into the fuel tank upon the refueling. However, in the case of employing, as a spring for biasing the valve element, a coil spring provided between the valve element and the end wall portion on the fuel end side of the valve casing, if the opening and closing stroke of the valve element is set to the sufficiently large value, the coil spring is liable to fall down. The coil spring can be prevented from falling down if spring guides fitting to the coil spring are projectingly provided at the valve element and the end wall portion of the valve casing, respectively. However, in this case, there arises such a problem that, since both the spring guides interfere with each other, it becomes difficult to set the stroke of the valve element to the sufficiently large value.

Further, the aforesaid related check valve is so arranged that the valve element formed by hard resin is seated on the valve seat portion of the valve casing formed by the hard resin. Thus, in the case where the fuel flows backward from the fuel tank side to the refueling pipe, the valve element collides with the valve seat portion, and thus there is a possibility that the durability and the sealing property of the valve element and the valve seat portion is degraded.

SUMMARY OF THE INVENTION

In view of the aforesaid problem of the related art, an object according to a first aspect of the present invention is to provide a check valve for a refueling pipe of a fuel tank with a pressure relief function for suppressing the increase of the pressure within a fuel tank.

In order to attain the aforesaid object, the first aspect of the present invention is arranged in a manner that in a check valve which is provided at the end portion on the fuel tank side of a refueling pipe communicating within the fuel tank so as to prevent the backward flow of the fuel from the fuel tank to the refueling pipe, a bypass hole is formed in the valve element of the check valve so as to communicate the upstream section with the downstream section thereof.

According to such an arrangement, in the case where the pressure within the fuel tank increases, the fuel or vapor within the fuel tank flows toward the refueling pipe side from the fuel tank side through the bypass hole, whereby the increase of the pressure within the fuel tank can be prevented.

In view of the aforesaid problem of the related art, an object according to a second aspect of the present invention is to provide a check valve for a refueling pipe of a fuel tank which can prevent a coil spring from being caused to fall down and can set the stroke of a valve element at the time of opening and closing the check valve to a sufficiently large value.

In order to attain the aforesaid object, the second aspect of the present invention is arranged in a manner that in a check valve which is provided at the end portion on the fuel tank side of a refueling pipe communicating within the fuel tank so as to prevent the backward flow of the fuel from the fuel tank to the refueling pipe, and a coil spring for biasing the valve element of the check valve toward a valve seat portion formed at the refueling pipe side of the valve casing of the check valve is provided between the valve element and the end portion on the fuel tank side of the valve casing, wherein a first spring guide to which outer periphery of one end portion of the coil spring is fitted is provided at one of the valve element and the valve casing, and a second spring guide to which the inner periphery of the other end portion of the coil spring is provided at the other of the valve element and the valve casing.

According to such an arrangement, in the case where the valve element is pushed and opened against the biasing force of the coil spring due to the pressure of the fuel supplied from the refueling pipe, the coil spring is guided by the first and second spring guides, so that the coil spring is prevented from being caused to fall down. Further, since the spring guides are not mutually aligned and therefore do not interfere to each other, the stroke of the valve element can be set to a sufficiently large value.

In view of the aforesaid problem of the related art, an object according to a third aspect of the present invention is to provide a check valve for a refueling pipe of a fuel tank which is excellent in durability and sealing property.

In order to attain the aforesaid object, the third aspect of the present invention is arranged in a manner that in a check valve which is provided at the end portion on the fuel tank side of a refueling pipe communicating within the fuel tank so as to prevent the backward flow of the fuel from the fuel tank to the refueling pipe, and a valve element of the check valve is biased by a biasing spring within the valve casing toward a valve seat portion of a tapered-shape formed at the refueling pipe side of the valve casing of the check valve, wherein a sealing member of elastic material having a lip portion seated on the valve seat portion is attached to the valve element.

According to such an arrangement, since the lip portion of the sealing member is seated on the valve seat portion at the time of the closing operation of the valve element, the impact caused by the collision between the valve seat portion and the valve element can be absorbed or lightened and further respectively the sealing property can be secured due to the elasticity of the lip portion.

Furthermore, in the case where the valve element is formed by a spring receiving member for a biasing spring and a main body member having an outer diameter set to be larger than the minimum diameter of the valve seat portion and smaller than the outer diameter of the lip portion, and further the sealing member is sandwiched between the main body member and the spring receiving member, the sealing member can be firmly held on the valve element. Further, since the main body member abuts against the valve seat portion, excessive bending of the lip portion due to the biasing force of the biasing spring can be prevented, and so the durability of the lip portion is improved and the sealing property thereof is surely secured.

BRIEF DESCRIPTION OF THE DRAWINGS

FIG. 2A is a side sectional view showing a cut-off state of a communicating path caused by the closing of a valve element.

FIG. 2B is a side sectional view showing a communicating state of the communicating path caused by the opening of the valve element.

DETAILED DESCRIPTION OF THE PREFERRED EMBODIMENTS

Figure 1:
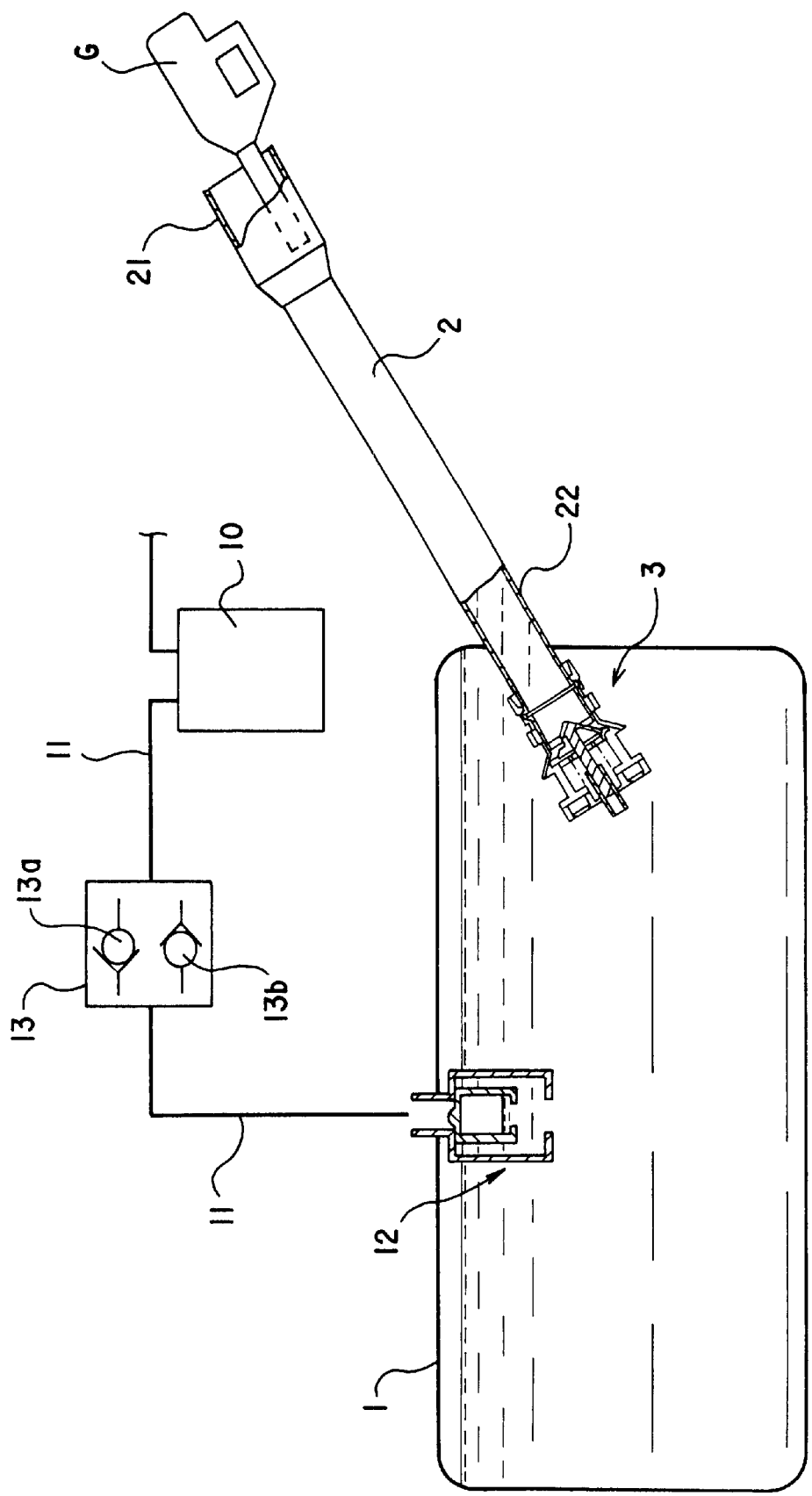
FIG. 1 is a sectional view showing an example of a check valve for a refueling pipe of a fuel tank according to an embodiment of the present invention.

A check valve for a refueling pipe of a fuel tank mounted on a vehicle according to an embodiment of the present invention will be explained with reference to the accompanying drawings.

With reference to FIG. 1, a reference numeral 1 depicts a fuel tank mounted on a vehicle. A refueling pipe 2 communicating within the fuel tank 1 is fixed to the fuel tank 1 in a manner that a refueling port 21 of the refueling pipe 2 is positioned at a portion higher than the fuel tank 1.

A vent path 11 communicating with a canister 10 is coupled to the fuel tank 1. A float valve 12 positioned at the inlet portion of the vent path 11 is provided within the fuel tank 1 so that the float valve 12 is closed when the fuel tank 1 is fully filled with fuel. A two-way valve 13 having a positive pressure valve 13a and a negative pressure valve 13b is provided at the vent path 11. The two-way valve 13 is arranged in such a manner that the vapor within the fuel tank 1 is conducted through the vent path 11 into the canister 10 and adhered thereto when the inner pressure of the fuel tank 1 becomes equal to, or more than, a predetermined positive pressure and the air is introduced within the fuel tank 1 through the vent path 11 when the inner pressure of the fuel tank 1 becomes equal to, or less than, a predetermined negative pressure, thereby maintaining the inner pressure of the fuel tank 1 within a predetermined range.

A check valve 3 is provided at the end portion 22 of the refueling pipe 2 in a manner that a valve casing 30 thereof houses a valve element 31 therein.

The valve casing 30 is configured by a cylindrical main body portion 300 and an end wall portion 301. The cylindrical main body portion 300 is formed by hard resin and has, at a portion on the refueling pipe 2 side thereof, that is, an upper portion thereof, a tapered valve seat portion 300a which diameter decreases gradually upward. The end wall portion 301 is also formed by hard resin and has an engagement pawl portion 301a which engages with the end portion of the fuel tank 1 side of the cylindrical main body portion 300, that is, a lower end thereof. The end wall portion 301 is formed with a cylindrical valve guide 301b for passing therethrough a rod 31a extending from the valve element 31 so that the valve guide 301b supports the valve element 31 so as to be freely movable along the axial direction of the valve casing 30. A cylindrical coil spring 32 serving as a biasing spring is provided between the valve element 31 and the end wall portion 301 thereby to bias the valve element 31 toward the valve seat portion 300a side. The end wall portion 301 is provided with a cylindrical first spring guide 32a which is upstanding therefrom so as to be concentric with the valve guide 301b and fits to the outer periphery of the end portion of the coil spring 32. Further, a plurality of opening portions 301c for passing the fuel therethrough are provided at the portions of the end wall portion 301 on the outer periphery side of the first spring guide 32a in the radial direction of the end wall portion 301.

Similarly, a plurality of opening portions 300b for passing the fuel therethrough are provided at the peripheral wall portions of the cylindrical main body portion 300 extending to the end wall portion 301 side from the valve seat portion 300a. A connection portion 300f for fitting to the end portion 22 of the refueling pipe 2 through an O ring 300e is formed at the upper end of the cylindrical main body portion 300. The connection portion 300f is extended into the lower end portion of a joint sleeve 302 which is fitted into the outer periphery of the refueling pipe 2 and an engaging piece 300g formed at the connection portion 300f is engaged with the joint sleeve 302, whereby the valve casing 30 is attached to the end portion 22 of the refueling pipe 2.

The valve element 31 is formed by an umbrella-shaped main body member 310 integrally formed with the rod 31a and a spring receiving member 311 abutting against the coil spring 32. A sealing member 312 is sandwiched between the main body member 310 and the spring-receiving member 311.

Both the main body member 310 and the spring-receiving member 311 are formed by the hard resin, while the sealing member 312 is formed by elastic material such as NBR (butadiene-acrylonitrile rubber), or the like. A lip portion 312a is formed at the outer periphery of the sealing member 312. The main body member 310 is provided with a flat flange portion 310a at its umbrella-shaped peripheral end portion. An engaging projection 310b projectingly provided at the rear surface of the flange portion 310a is engaged with an engagement hole formed at the spring receiving member 311 through the sealing member 312, so as to assemble the valve element by a single process. The outer diameter of the flange portion 310a is set to be larger than the minimum diameter of the valve seat portion 300a and smaller than the outer diameter of the lip portion 312a. According to such an arrangement, the lip portion 312a can be seated on the valve seat portion 300a to thereby ensure the sealing property. Further, since the flange portion 310a abuts against the valve seat portion 300a, the lip portion 312a is prevented from being bent excessively and so the durability of the lip portion 312a is ensured. Incidentally, although it is possible to form a concave groove on the outer peripheral surface of the valve element 31 and fit the sealing member 312 into the groove, it is preferable to sandwich the sealing member 312 between the main body member 310 and the spring-receiving member 311 in the aforesaid manner because the drop-out of the sealing member 312 can be surely prevented.

Each of the spring-receiving member 311 and the sealing member 312 is set to have an annular inner diameter larger than the outer diameter of the valve guide 301b. That is, the spring receiving member 311 and the sealing member 312 are constructed so that they do not interfere with the valve guide 301b when the valve element 31 moves downward to open the check valve. A cylindrical second spring guide 32b for fitting with the inner periphery of the end portion of the coil spring 32 is provided at the inner peripheral end of the spring receiving member 311 so as to protrude perpendicularly therefrom. Thus, the first spring guide 32a and the second spring guide 32b can cooperatively prevent the coil spring 32 from falling down. It is possible to form both the first spring guide 32a and the second spring guide 32b so as to fit to the inner periphery or the outer periphery of the end portion of the coil spring 32. However, in this case, since the first spring guide 32a and the second spring guide 32b interfere with each other, the stroke of the valve element 31 at the time of opening and closing the check valve can not be set to a sufficiently large value. In contrast, in the present embodiment, since the first spring guide 32a is fitted to the outer periphery of the end portion of the coil spring 32 and the second spring guide 32b is fitted to the inner periphery of the end portion of the coil spring 32, the first spring guide 32a and the second spring guide 32b do not interfere to each other. Accordingly, as shown in FIG. 2B, since the valve element 31 can be continuously pushed and opened until the spring-receiving member 311 abuts against the end face of the first spring guide 32a, the opening and closing stroke of the valve element 31 can be set to a sufficiently large value. In this respect, the first spring guide 32a fitting with the outer periphery of the end portion of the coil spring 32 may be formed at the spring-receiving member 311 and the second spring guide 32b fitting with the inner periphery of the end portion of the coil spring 32 may be formed at the end wall portion 301.

The valve element 31 is provided with a bypass hole 31b for communicating an upstream section (refueling port side) and a downstream section (fuel tank side) of the valve element 31. In the present embodiment, the bypass hole 31b is formed in a counterbore portion of the slanted portion of the umbrella-shaped main body member 310 of the valve element 31 so as to penetrate the main body member 310 between the front and rear surfaces thereof. The diameter of the bypass hole 31b should be set to such a small as value not to degrade the backward flow prevention function of the fuel which is the primary function of the check valve 3.

When a refueling nozzle G is inserted into the refueling port 21 of the refueling pipe 2 to flow the fuel therein, as shown in FIG. 2B, the valve element 31 is pushed and opened against the biasing force of the coil spring 32 due to the dynamic pressure of the fuel flowing within the refueling pipe 2. Thus, the fuel is injected within the fuel tank 1 through the opening portions 300b of the cylindrical main body portion 300.

At the time of opening the valve element 31, the second spring guide 32b and the first spring guide 32a approach to each other while guiding the coil spring 32. Finally, the coil spring 32 is sandwiched on the inner and outer peripheries thereof with the first spring guide 32a disposed on the outer periphery side of the coil spring 32 and the second spring guide 32b disposed on the inner periphery side of the coil spring 32, so that the coil spring 32 is prevented from being caused to fall down. Further, since the first and second spring guides 32a, 32b do not interfere with each other and the opening and closing stroke of the valve element 31 can be set to a sufficiently large value, the fuel can be injected within the fuel tank smoothly.

The breathing operation of the air within the fuel tank 1 is performed through the vent path 11 at the time of injecting the fuel within the fuel tank 1. When the fuel tank 1 is fully filled with the fuel, the float valve 12 closes the vent path 11 to stop the breathing operation. Immediately after the closing of the float valve 12, the pressure within the fuel tank 1 increases pulsatively due to the inertia of the fuel supplied from the refueling pipe 2, and so the fuel is likely to flow backward from the fuel tank 1 side to the refueling pipe 2 due to the reaction. However, in this case, the valve element 31 is pushed up by the inner pressure of the fuel tank 1 which acts on the rear surface of the valve element 31 through the opening portions 301c of the end wall portion 301 of the valve casing 30, so that the check valve 3 is closed to thereby prevent the backward flow of the fuel. In this manner, such a so-called spitting phenomenon that the fuel rapidly rises within the refueling pipe 2 and spouts out of the refueling port 21 before the operation of the automatic-stop mechanism of the refueling nozzle G can be prevented. In this respect, at the time of the closing operation of the check valve 3, since the lip portion 312a of the sealing member 312 is seated on the valve seat portion 300a, the impact upon closing the check valve can be absorbed or lightened by the elasticity of the sealing member 312. Accordingly, the degradation of the durability of the valve seat portion 300a and the valve element 31 due to the abrasion caused by the impact can be suppressed.

After completion of the fuel supply, the refueling port 21 of the refueling pipe 2 is closed by a refueling cap (not shown). The refueling cap is provided with a pressure relief valve which is set to be opened at a pressure higher than the pressure for opening the positive pressure valve 13a of the two-way valve 13, whereby the excessive increase of the pressure within the fuel tank 1 due to the clogging of the vent path 11, or the like, can be prevented by the operation of the pressure relief valve. In this respect, when the check valve 3 is closed, the communicating state between the inner portion of the fuel tank 1 and the refueling pipe 2 is cut off, so that the pressure relief valve may not be able to perform the pressure relief function. However, in the present embodiment, since the bypass hole 31b is formed at the valve element 31 of the check valve 3 as described above, the inner portion of the fuel tank 1 is kept to be communicated with the refueling pipe 2 through the bypass hole 31b even if the check valve 3 is closed.

Thus, in the case where the pressure within the fuel tank 1 increases due to the clogging of the vent path 11, the fuel flows into the refueling pipe 2 through the bypass hole 31b when the check valve 3 is located below the liquid surface of the fuel within the fuel tank 1, while the vapor flows into the refueling pipe 2 through the bypass hole 31b when the check valve 3 is located above the liquid surface of the fuel within the fuel tank 1. With this structure, the excessive increase of the pressure within the fuel tank 1 due to the clogging of the vent path 11 or the like, can be prevented by the operation of the pressure relief valve of the refueling cap.

As is clear from the aforesaid explanation, according to the first aspect of the present invention, since the inner portion of the fuel tank and the refueling pipe are kept to be communicated through the bypass hole formed in the valve element even if the check valve is closed, the path for releasing the pressure within the fuel tank can be secured and hence the fail-safe with respect to the clogging of the vent path, or the like, can be performed.

Further, as is clear from the aforesaid explanation, according to the second aspect of the present invention, since the coil spring is prevented from falling down and the stroke of the valve element at the time of opening and closing the check valve can be set to a sufficiently large value, the fuel can be supplied within the fuel tank smoothly.

Furthermore, as is clear from the aforesaid explanation, according to the third aspect of the present invention, since the impact caused by the collision between the valve seat portion and the valve element can be absorbed or lightened, a check valve for a refueling pipe which is excellent in durability and sealing property can be obtained.

The present disclosure relates to the subject matter contained in Japanese patent application Nos. Hei. 10-185055, 10-185056 and 10-185057, respectively, filed on Jun. 30, 1998 which are expressly incorporated herein by reference in its entirety.

While only certain embodiments of the invention have been specifically described herein, it will apparent that numerous modifications may be made thereto without departing from the spirit and scope of the invention.

What is claimed is:

1. A check valve for a refueling pipe of a fuel tank, which is provided at an end portion on a fuel tank side of the refueling pipe communication with the fuel tank and wherein said fuel tank and an end portion of said refueling pipe opposite to said fuel tank contain corresponding pressures, and for preventing the backward flow of fuel from the fuel tank to the refueling pipe, said check valve comprising:

a valve element; and a bypass hole formed in the valve element and penetrating the valve element to open directly to the refueling pipe interior to constantly communicate the interior of the fuel tank with the interior of the refueling pipe.

2. A check valve for a refueling pipe of a fuel tank, according to claim 1, wherein the bypass hole has a diameter set so as not to degrade the backward fuel flow prevention function.

3. A check valve for a refueling pipe of a fuel tank, which is provided at an end portion on a fuel tank side of the refueling pipe communicating within the fuel tank, and prevents the backward flow of fuel from the fuel tank to the refueling pipe, said check valve comprising:

a valve casing formed with a valve seat portion having a tapered shape;

a valve element linearly movable within the valve casing;

a biasing spring biasing the valve element toward the valve seat portion;

an elastic seal member attached to the valve element and having a lip portion contactable with the valve seat portion, and wherein the valve element includes a main body member and a spring receiving member for a biasing spring sandwiching the sealing member between the main body member and the spring receiving member, an engaging projection projecting from a rear surface of the main body member and engagement holes formed in said sealing member and said spring receiving member to receive said engaging projection from said main body member whereby integral assembly of said main body member, said spring receiving member and said sealing member is enabled, and each of the main body member and the spring receiving member has an outer diameter set to be larger than the minimum diameter of the valve seat portion and smaller than the outer diameter of the lip portion.

* * * * *